United States Patent
Hackert et al.

(10) Patent No.: US 10,206,538 B2
(45) Date of Patent: Feb. 19, 2019

(54) ELECTRIC KITCHEN APPLIANCE

(71) Applicant: Vorwerk & Co. Interholding GmbH, Wuppertal (DE)

(72) Inventors: Georg Hackert, Bochum (DE); Stefan Hilgers, Essen (DE); Jutta Schomacher, Wuelfrath (DE); Andres Sauerwald, Bottrop (DE)

(73) Assignee: Vorwerk & Co. Interholding GmbH, Wuppertal (DE)

(*) Notice: Subject to any disclaimer, the term of this patent is extended or adjusted under 35 U.S.C. 154(b) by 331 days.

(21) Appl. No.: 14/930,978

(22) Filed: Nov. 3, 2015

(65) Prior Publication Data
US 2016/0120368 A1    May 5, 2016

(30) Foreign Application Priority Data
Nov. 4, 2014 (DE) .......... 10 2014 116 075

(51) Int. Cl.
*A47J 43/07* (2006.01)
*G05B 15/02* (2006.01)
*G05G 1/12* (2006.01)

(52) U.S. Cl.
CPC ............. *A47J 43/07* (2013.01); *G05B 15/02* (2013.01); *G05G 1/12* (2013.01)

(58) Field of Classification Search
CPC ............ A47J 43/07; G05G 1/12; G05B 15/02
USPC ............... 715/700–866; 345/156–184
See application file for complete search history.

(56) References Cited

U.S. PATENT DOCUMENTS

| | | | |
|---|---|---|---|
| 3,424,519 A * | 1/1969 | White | A61B 3/06 351/222 |
| 4,859,922 A | 8/1989 | Tauchenitz et al. | |
| 5,877,710 A * | 3/1999 | Kagerbauer | G05B 19/106 200/19.02 |
| 2008/0066630 A1 * | 3/2008 | Siu | A23N 1/02 99/510 |

(Continued)

FOREIGN PATENT DOCUMENTS

DE    36 05 088 A1    11/1987
DE    10 2009 058 258 A1    6/2011
(Continued)

*Primary Examiner* — Kenneth M Lo
*Assistant Examiner* — David J Wynne
(74) *Attorney, Agent, or Firm* — Collard & Roe, P.C.

(57) ABSTRACT

The invention relates to an electrical kitchen appliance for processing food by means of at least one processing function, which can be set by a user, as well as to a corresponding method. The electrical kitchen appliance (1) is provided with a setting device (6) for the user-side setting of at least one parameter of the processing function, wherein the setting device (6) is embodied as rotary knob. According to the invention, provision is made for an operating mode, in which the parameter is changed by a first amount for each angle of rotation by rotating the rotary knob in one direction and in which the parameter is changed by a second amount for each angle of rotation by rotating the rotary knob in the opposite direction, wherein the first amount differs from the second amount. This solves the object of specifying an electrical kitchen appliance, by means of which a parameter of a processing function can be input on the user-side in a simple, quick and reliable manner.

6 Claims, 3 Drawing Sheets

(56) References Cited

U.S. PATENT DOCUMENTS

Figure 1:
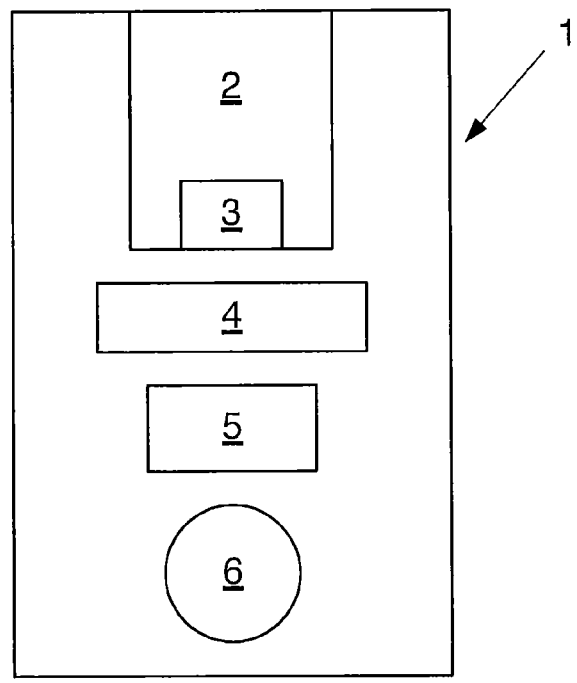

| | | | | |
|---|---|---|---|---|
| 2011/0147366 A1* | 6/2011 | Franca | ................ | H05B 1/0266 |
| | | | | 219/443.1 |
| 2013/0093709 A1* | 4/2013 | Fujibayashi | ........ | G06F 3/04847 |
| | | | | 345/173 |
| 2013/0204406 A1* | 8/2013 | Andersson | .......... | A47L 15/4293 |
| | | | | 700/83 |

FOREIGN PATENT DOCUMENTS

| | | | | |
|---|---|---|---|---|
| DE | 102009058258 | * | 6/2011 | .............. A47J 27/62 |
| DE | 10 2011 052 405 A1 | | 1/2013 | |
| DE | 10 2012 013 011 A1 | | 1/2014 | |
| EP | 2 556 778 A1 | | 2/2013 | |
| WO | 96/04595 A1 | | 2/1996 | |

\* cited by examiner

ELECTRIC KITCHEN APPLIANCE

CROSS REFERENCE TO RELATED APPLICATIONS

Applicant claims priority under 35 U.S.C. § 119 of German Application No. 10 2014 116 075.4 filed on Nov. 4, 2014, the disclosure of which is incorporated by reference.

The invention relates to an electrical kitchen appliance for processing food by means of at least one processing function, which can be set by a user, comprising a setting device for the user-side setting of at least one parameter of the processing function, wherein the setting device is embodied as rotary knob, as well as to a corresponding method for operating the electrical kitchen appliance.

Such electrical kitchen appliances are well-known from practice, e.g. in the form of universal kitchen appliances, wherein these kitchen appliances often also make it possible to cook the food in addition to mechanically processing food, e.g. by means of a mixing unit or cutting blade. To prepare a corresponding dish, provision is made on principle for predetermined recipes, which have a plurality of consecutive recipe steps and which can be accessed by the user of the electrical kitchen appliance.

To make it possible for the user of such an electrical kitchen appliance to prepare a dish according to such a predetermined recipe, thus to be able to select a certain recipe, but also to directly control the electrical kitchen appliance with the functions thereof, such appliances typically have a setting device for the user-side setting of processing functions. Typically, such setting devices are thereby integrated into the electrical kitchen appliance, e.g. in the form of a rotary knob or also in the form of a touch display.

It is the object of the invention to specify an electrical kitchen appliance as well as a method for operating the electrical kitchen appliance, by means of which a parameter of a processing function can be input on the user-side in a simple, quick and reliable manner.

According to the device, this object is solved by means of the subject matter of one aspect of the invention. Preferred further developments of the invention are discussed below.

The solution of the object thus lies in an electrical kitchen appliance for processing food by means of at least one processing function, which can be set by a user, comprising a setting device for the user-side setting of at least one parameter of the processing function, wherein the setting device is embodied as rotary knob, characterized in that provision is made for an operating mode, in which the parameter is changed by a first amount for each angle of rotation by rotating the rotary knob in one direction and in which the parameter is changed by a second amount for each angle of rotation by rotating the rotary knob in the opposite direction, wherein the first amount differs from the second amount.

A significant point of the invention is thus that provision is also made in any event for an operating mode of the electrical kitchen appliance, in which a rotating of the rotary knob in opposite directions, as function of the direction of rotation, in each case results in different changes in value in response to setting the parameter of the processing function. If the parameter of the processing function pertains to the setting of a time, e.g., provision can be made for the rotation of the rotary knob to the right sets the time in seconds, while a rotation of the rotary knob to the left by the same angle value sets the minutes, thus that a time, which is 60-times larger is set in response to rotating the rotary knob to the left with the same angle of rotation.

The invention provides for such an operating mode to be realized in the case of the kitchen appliance according to the invention in any event. This can be the only operating mode. In the alternative, however, other operating modes, at least one different operating mode, can also be available.

When providing rotary knobs on common electrical kitchen appliances for setting parameters of processing functions of the electrical kitchen appliances, it is generally the case that a rotation of the rotary knob to the right increases the parameter and that a rotation of the rotary knob to the left decreases the parameter. On principle, this can also be provided in the case of the electrical kitchen appliance according to the invention. According to a preferred further development of the invention, however, the direction, in which the parameter is changed by rotating the rotary knob in the one direction or in the other direction, respectively, is the same. This means that it is always possible to either attain only an increase or a decrease of the parameter, which is to be set, regardless of the direction of rotation of the rotary knob. With reference to the above example, according to which a time is set by means of the rotary knob, this means that the minutes can be set first by rotating the rotary knob in the one direction and that the additional seconds can then be chosen by rotating the rotary knob in the opposite direction, as fine tuning, so to speak.

On principle, the direction, in which the parameter is changed by rotating the rotary knob in the one or in the other direction, respectively, can be preset and not capable of being changed. According to a preferred further development of the invention, however, provision is made for a first switch-over device, which provides for a first switch-over function, by means of which the direction, in which the parameter is changed by rotating the rotary knob in the one or in the other direction, respectively, can be switched over. The first switch-over device thus makes it possible to switch back and forth between two modes of the rotary knob, namely between a first mode, in which a rotation, independent from the direction of rotation, leads to an increase of the parameter of the processing function, which is to be set, and a different mode, in which, also independent from the direction of rotation of the rotary knob the parameter is always decreased in response to the setting of the parameter of the processing function. This is advantageous in particular inasmuch as a setting of the parameter of the processing function, which has already been attained, can also be "turned back", e.g. if a setting beyond a desired, predetermined value occurred inadvertently.

On principle, the first switch-over device can differ from the setting device, it can thus be embodied as separate device of the electrical kitchen appliance. Preferably, the setting device, however, is embodied as push/rotary knob, wherein the first switch-over function can be activated by pushing the push/rotary knob. This has the advantage that the setting of the parameter of the processing function as well as the switch-over between an increasing of the parameter can be attained by rotating the push/rotary knob or a decreasing of the parameter, respectively, by rotating the push/rotary knob via a common device. The user thus does not need to change back and forth between different devices of the electrical kitchen appliance in response to setting or switching over the setting device, respectively.

The pushing of the push/rotary knob can thereby be formed by means of different push functions. A simple short pushing, e.g., is possible, but also a "double click", thus quickly pushing the push/rotary knob twice in a row. Finally, a long pushing is also possible for activating the first switch-over function, thus pushing the push/rotary knob beyond a predetermine time period. The provision of different push functions has the advantage that not only the first switch-over function can be activated via the push/rotary knob, as a function of the respective determined push function, but that other functions can also be controlled.

As already explained above, the operating mode, in which different changes in value occur as a function of the direction of rotation of the rotary knob in response to the same rotation of the rotary knob, can be the only operating mode. According to a preferred further development of the invention, provision is made, however, for a second switch-over device, which provides for a second switch-over function, by means of which a different operating mode can be activated, in that the parameter is in each case changed by the same amount for each angle of rotation by means of rotating the rotary knob in the one direction or in the opposite direction, respectively. This is thus an operating mode, as it is already known from common electrical kitchen appliances, namely that the direction of rotation of the rotary knob does not influence the respective amount of the changes in value. A particularly preferred embodiment additionally provides for the directions, in which the parameter is changed by rotating the rotary knob in the one direction or in the other direction, respectively, are opposite to one another in the other operating mode. This means, in other words, that provision is thus made for an operating mode, in which the rotary knob can also be operated in the same manner, as is generally known from rotary knobs, namely such that a rotation in the one direction leads to an increase of the parameter, which is to be set, and such that a rotation in the other direction leads to a decrease, wherein the amounts of the changes in value are the same in both directions in the case of an angle of rotation, the amount of which is the same.

Finally, provision is made according to a preferred further development of the invention for a touch display, wherein the first switch-over function and/or the second switch-over function can be activated by means of the touch display. On principle, this can be provided as an alternative or in addition to the realization of the switch-over functions by means of the rotary knob or push/rotary knob, respectively. The use of a touch display for such switch-over functions is advantageous inasmuch as a correspondingly labelled keypad can be displayed, in which it is specified, what is effected by pressing this keypad, e.g. a switch-over between different operating modes or a reversal of the direction, in which the change of a parameter of the processing function, which is to be set, occurs, thus only an increasing or only a decreasing, independent from the direction of rotation. The provision of such a touch display makes it easier for the user to operate the electrical kitchen appliance inasmuch as the user does no longer need to deal with the impacts, which different push functions effect in the case of the push/rotary knob, in advance. In fact, the effect of the respective pushing of a push button on the touch display for switch-over functions is displayed to him in clear words.

According to the method, the object mentioned further above is moreover solved by means of the subject matter of another aspect of the invention, thus a method for operating an electrical kitchen appliance for processing food by means of at least one processing function, which can be set by a user, wherein the electrical kitchen appliance has a setting device for the user-side setting of at least one parameter of the processing function, and the setting device is embodied as rotary knob, characterized in that the parameter is changed by a first amount for each angle of rotation in an operating mode by rotating the rotary knob in one direction, and the parameter is changed by a second amount for each angle of rotation by means of rotating the rotary knob in the opposite direction, wherein the first amount differs from the second amount.

Preferred further developments of the method according to the invention follow analogously to the afore-described preferred further developments of the electrical kitchen appliance according to the invention.

A further solution of the above-mentioned object, namely independent from or in addition to the afore-described solutions, is provided by the subject matters of further aspects of the invention.

The invention thus also relates to an electrical kitchen appliance for processing food by means of at least one processing function, which can be set by a user and which can in particular be combined with the solutions, which have been described above for the electrical kitchen appliance, comprising a setting device for the user-side setting of at least one parameter of the processing function, wherein the setting device is embodied as rotary knob, characterized in that provision is made for an operating mode, in the case of which the acceleration of the rotation of the rotary knob is determined in response to the rotation of the rotary knob, and the parameter of the processing function is set automatically on the basis of the determined acceleration.

According to this aspect of the invention, it does not pertain to the determination of the actual rotation of the rotary knob, thus the determination of the angular range, across which the rotary knob was rotated, or the direction of rotation, respectively. It is determined, in fact, how the acceleration of the rotation of the rotary knob behaves in response to the actuation by the user. This determined acceleration is then used to set the parameter of the processing function based on said acceleration. A corresponding setting of the parameter of the processing function, which is thus set automatically, is thus in each case assigned to certain determined acceleration values.

On principle, it is sufficient for this purpose to only determine the acceleration of the rotary knob in response to the rotation by the user and to consider it for the setting of the parameter of the processing function. However, provision is made according to a preferred further development of the invention for determining the direction of rotation in addition to the acceleration in response to the rotation of the rotary knob, and to also consider it for the automatic setting of the processing function. In particular, provision is made according to a preferred further development of the invention for the automatic setting of the processing function to comprise an automatic recipe selection. It is particularly preferred in this context for the automatic recipe selection to be based on a quasi-random function.

The acceleration of the rotation of the rotary knob can thus be evaluated in this context in response to a recipe selection in such a "random mode", whereby the automatic selection of a recipe occurs. Due to the fact that the acceleration of the rotary knob can only occur with great difficulty in a predetermined manner in response to a rotation by the user of the electrical kitchen appliance, the user can thus not be sure in the end to attain a certain acceleration, the acceleration can thus be used to generate an automatic recipe selection, which is random for the user, thus to offer a recipe to the user, which he has not chosen actively, but which he has chosen "randomly" by means of the acceleration of the rotary knob generated by him, in the context of the quasi-random function.

This selection of a recipe in a "random" manner can have been preceded by a compilation of the user's favorite recipes, which are based on available ingredients or similar information, e.g. The user of the electrical kitchen appliance can select the recipe ingredients available to him, e.g. by scrolling in a list of ingredients, which is displayed to him on a display device of the electrical kitchen appliance, and the electrical kitchen appliance then offers him a recipe, which is "randomly" selected as a result of the determined acceleration of the rotary knob, from a list of available recipes, which is possible based on these selected ingredients.

Finally, the above-mentioned object is also solved by means of a method for operating an electrical kitchen appliance for processing food by means of at least one processing function, which can be set by a user, in particular in combination with the afore-described method, wherein the electrical kitchen appliance has a setting device for the user-side setting of at least one parameter of the processing function and the setting device is embodied as rotary knob, characterized in that the acceleration of the rotation of the rotary knob is determined in an operating mode in response to the rotation of the rotary knob and the parameter of the processing function is set automatically on the basis of the determined acceleration.

Preferred embodiments of this method according to the invention follow analogously to the afore-described preferred exemplary embodiments of the electrical kitchen appliance according to the invention.

The invention will be specified in more detail below by means of preferred exemplary embodiments with reference to the drawing.

Figure 2:
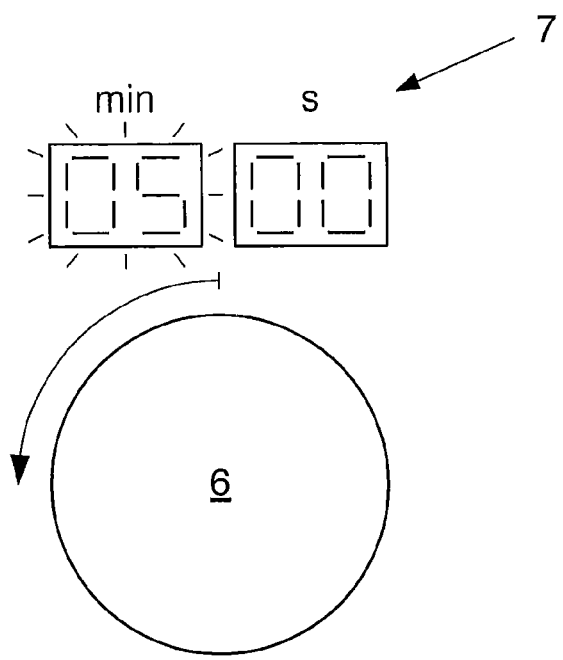
Figure 3:
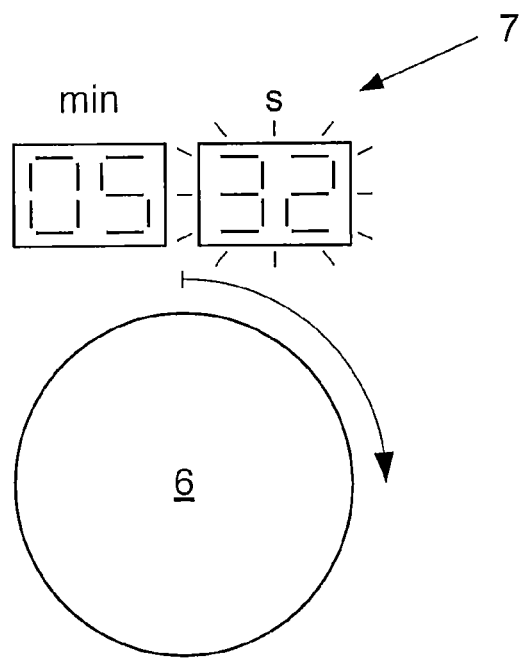
Figure 4:
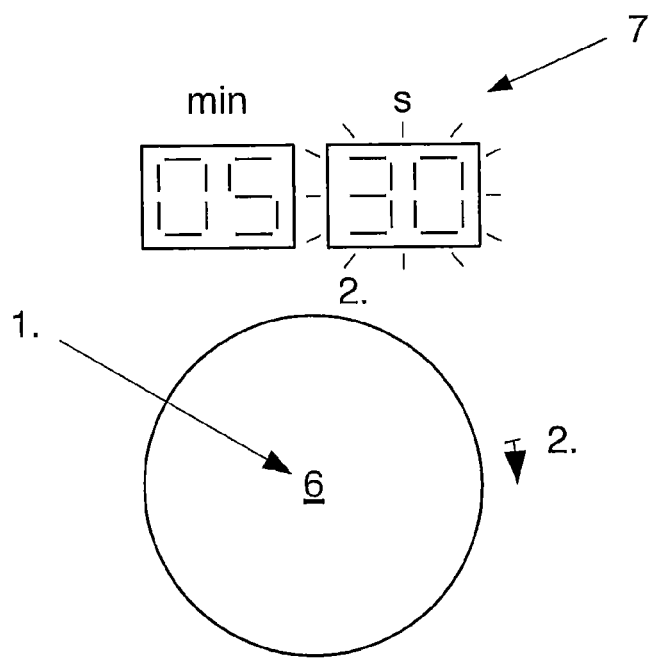
Figure 5:
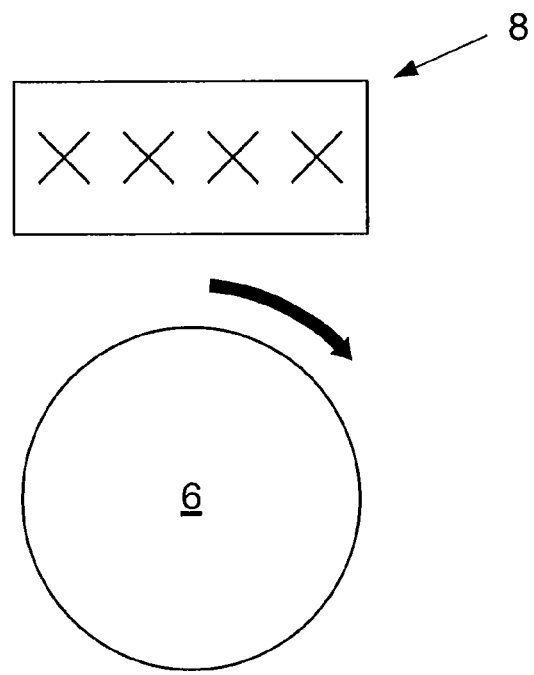
Figure 6:
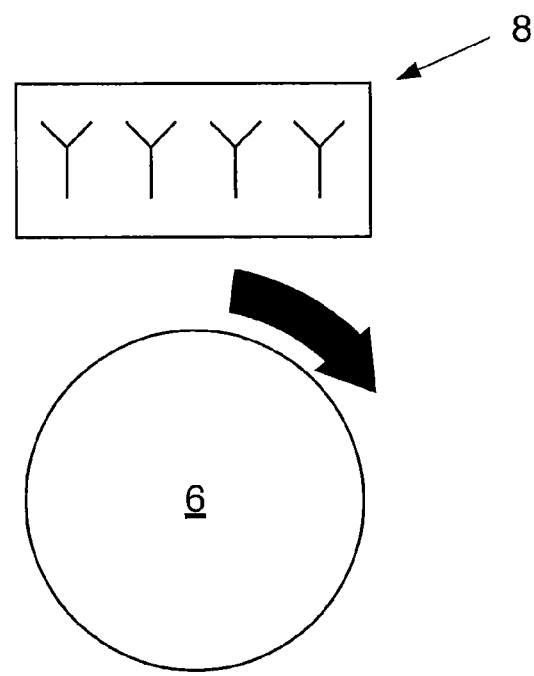

FIG. 1 shows an electrical kitchen appliance comprising its essential components according to a preferred exemplary embodiment of the invention, in a schematic manner, FIG. 2 shows the operation of the push/rotary knob of the electrical kitchen appliance according to the preferred exemplary embodiment of the invention for setting a time period in minutes, in a schematic manner, FIG. 3 shows the operation of the push/rotary knob of the electrical kitchen appliance according to the preferred exemplary embodiment of the invention for setting the time period in seconds, in a schematic manner, FIG. 4 shows the operation of the push/rotary knob of the electrical kitchen appliance according to the preferred exemplary embodiment of the invention for correcting the timer period in seconds, in a schematic manner, FIG. 5 shows the operation of the push/rotary knob of the electrical kitchen appliance according to the preferred exemplary embodiment of the invention for selecting a first recipe by means of a quasi-random function, in a schematic manner, and FIG. 6 shows the operation of the push/rotary knob of the electrical kitchen appliance according to the preferred exemplary embodiment of the invention for selecting a second recipe by means of a quasi-random function, in a schematic manner.

An electrical kitchen appliance 1 according to a preferred exemplary embodiment of the invention comprising its essential components can be seen from FIG. 1. The electrical kitchen appliance 1 has a processing chamber 2, into which food can be placed for processing. To process the food, provision is made in the processing chamber 2 for a mixing and cutting unit 3 as processing device. The mixing and cutting unit 3 is controlled by a central control unit 4, which also controls the electrical kitchen appliance 1 apart from that and which coordinates the different components thereof with one another.

In particular, the central control unit 4 can control the mixing and cutting unit 3 with regard to the speed thereof and with regard to the operating time thereof, e.g. thus in the form of "speed stage 7 for 10 seconds" in response to a corresponding control by a user. To give the user of the electrical kitchen appliance 1 the opportunity to carry out a corresponding control, namely either directly by inputting the corresponding parameters or indirectly by selecting a corresponding recipe, the electrical kitchen appliance 1 has a touch display 5 as well as a setting device 6, namely in the form of a push/rotary knob. Different functions can be displayed on the touch display 5, which the user of the electrical kitchen appliance 1 can select by touching it. The setting device 6 furthermore provides the opportunity, namely due to its push or rotary function, respectively, to set certain parameters, which are displayed on the touch display 5, or to change between different operating modes, respectively.

The functionality ascribed to the setting device 6 according to a first aspect of the instant described preferred exemplary embodiment can be seen schematically from FIGS. 2, 3 and 4. A part 7 of the touch display 5, thus a section of the touch display 5, which display a time period set by the user by means of the setting device 6 in minutes ("min") as well as in seconds ("s"), is shown therein. This time period displayed by the part 7 of the touch display 5 displays, how long the mixing and cutting unit 3 is controlled by the central control unit 4 at a predetermined speed, which is not further relevant in the case at hand.

To set this time period, the user now proceeds in such a manner that, first, namely to set the time in minutes, he turns the setting device, which can be rotated to the left as well as to the right as push/rotary knob, to the left until the desired number of minutes, "5" in the case at hand, is displayed. As is suggested schematically by the arrow, it is necessary for this purpose for the user to rotate the setting device 6 to the left, approximately by 90°.

In a second step, which is illustrated in FIG. 3, the user now sets the seconds. In the case at hand, the setting of 30 seconds is desired, for the purpose of which the user rotates the setting device 6 to the right, also by approximately 90°. Even though the user thus virtually always rotated the setting device 6 by the same angle value in response to setting the minutes on the one hand and in response to setting the seconds on the other hand, a setting of 5 minutes had been associated with the rotation to the left, while the rotation to the right resulted only in a setting of approximately 30 seconds. This is based on the fact that the setting device 6, as push/rotary knob, does not only determine the covered angular range in response to the rotation, but also the direction of rotation and that provision is made for changes in value, which differ with regard to their amounts, for different directions of rotation.

For controlling the instant parameter, which is to be set in the case at hand, thus the time period for operating the mixing and cutting unit 3, a rotation of the setting device to the left effects an increase of the time period, which is ten times higher than a rotation to the right. This provides for a rough setting by rotating the setting device 6 to the left, followed by a fine setting of the time period by rotating the setting device 6 to the right.

As can be gathered from the part 7 of the touch display 5 for displaying the time period in FIG. 3, the user, however, was not able in the case at hand to accurately set an additional time period of 30 seconds. Instead, the rotation of the setting device 6 to the right resulted in a setting of 32 seconds, which the user now wants to correct, so as to get to the actually desired setting of 30 seconds. The course of action for this can be gathered from FIG. 4. It is suggested there by means of an arrow, which is identified with "1" that the user pushes the setting device 6 in the form of the push/rotary knob in a first step. This pushing of the setting device 6 has the result that the direction, in which the parameter, which is to be set, is changed, thus the time period, is reversed in response to the rotation of the setting device 6 in the one or in the other direction, respectively. To thus correct the time from 32 to 30 seconds, the user rotates the setting device 6 to the right again in a second step, identified with "2" in FIG. 4, because he can hereby carry out the fine setting, but only by a smaller amount, because he only wants to set 2 seconds. As a result of the previous pushing of the setting device 6, these 2 seconds are not added, but are deducted, because the direction, in which the parameter, which is to be set, is changed, thus the time period in the case at hand, has reversed.

According to the instant described preferred exemplary embodiment of the invention, a further functionality can be ascribed to the setting device 6. In addition to setting a time period, an automatic recipe selection can also occur on the basis of a quasi-random function by means of the setting device 6, which is embodied as push/rotary knob. This is so, because the setting device 6 does not only determine the angle of rotation and the direction of rotation, but also the acceleration of the rotation of the setting device 6, when it is rotated by the user. Based on the determined acceleration of the setting device 6, a random selection of a recipe, which is at least subjective for the user, can be attained in an operating mode, which is selected by the user on the touch display beforehand.

This is so, because the electrical kitchen appliance according to the instant described preferred exemplary embodiment of the invention provides such a function for the "random" selection of a recipe, which, based on the ingredients available to the user, which the user has selected by scrolling in a list, which is displayed to him on the touch display 5, leads to a quasi-random selection of a recipe, which can be created with these ingredients. This is so, because exactly one recipe is in each case assigned in the kitchen appliance 1 to the accelerations, which are possible in response to the rotation of the setting device 6, so that a quasi-random recipe selection occurs via the actually determined acceleration of the setting device 6, which can virtually not be influenced by the user, because the user cannot control or predict, respectively, the acceleration of the setting device 6 to a sufficiently accurate extent.

LIST OF REFERENCE NUMERALS electrical kitchen appliance 1
processing chamber 2
mixing and cutting unit 3
central control unit 4
touch display 5
setting device 6
part of the touch display for displaying a time period 7
part of the touch display for displaying a selected recipe 8

The invention claimed is:

1. An electrical kitchen appliance for processing food by means of at least one processing function, which can be set by a user, comprising a mixing and cutting unit and a setting device for the user-side setting of at least one of a control time period and a speed of the mixing and cutting unit, wherein the setting device is embodied as rotary knob, wherein provision is made for an operating mode, in which at least one of the control time period and the speed is changed by a first amount for each angle of rotation by rotating the rotary knob in one direction and in which at least one of the control time period and the speed is changed by a second amount for each angle of rotation by rotating the rotary knob in the opposite direction, wherein the first amount differs from the second amount, wherein the direction, in which the parameter is changed by rotating the rotary knob in the one direction or in the other direction, respectively, is the same, wherein provision is made for a first switch-over device, which provides for a first switch-over function, by means of which the direction, in which at least one of the control time period and the speed is changed by rotating the rotary knob in the one or in the other direction, respectively, can be switched over, and wherein the setting device is embodied as push/rotary knob and the first switch-over function can be activated by pushing the push/rotary knob.

2. The electrical kitchen appliance according to claim 1, wherein provision is made for a second switch-over device, which provides for a second switch-over function, by means of which a different operating mode can be activated, wherein at least one of the control time period and the speed is in each case changed by the same amount for each angle of rotation by means of rotating the rotary knob in the one direction or in the opposite direction, respectively.

3. The electrical kitchen appliance for processing food by means of at least one processing function, which can be set by a user, according to claim 1, comprising a setting device for the user-side setting of at least one of the control time period and the speed, wherein the setting device is embodied as rotary knob, wherein provision is made for an operating mode, in which the acceleration of the rotation of the rotary knob is determined in response to the rotation of the rotary knob, and at least one of the control time period and the speed is set automatically on the basis of the determined acceleration.

4. The electrical kitchen appliance according to claim 3, wherein the automatic setting comprises an automatic recipe selection.

5. The electrical kitchen appliance according to claim 4, wherein the automatic recipe selection is based on a quasi-random function.

6. A method for operating an electrical kitchen appliance for processing food by means of at least one processing function, which can be set by a user, wherein the electrical kitchen appliance has a mixing and cutting unit and a setting device for the user-side setting of at least one of a control time period and a speed of the mixing and cutting unit, and the setting device is embodied as rotary knob, wherein at least one of the control time period and the speed is changed by a first amount for each angle of rotation in an operating mode by rotating the rotary knob in one direction, and at least one of the control time period and the speed is changed by a second amount for each angle of rotation by means of rotating the rotary knob in the opposite direction, wherein the first amount differs from the second amount, wherein the acceleration of the rotation of the rotary knob is determined in an operating mode in response to the rotation of the rotary knob and at least one of the control time period and the speed is set automatically on the basis of the determined acceleration, and wherein the automatic setting comprises an automatic recipe selection, and wherein exactly one recipe is in each case assigned in the kitchen appliance to the acceleration, which are possible in response to the rotation of the setting device, so that a quasi-random recipe selection occurs via the actually determined acceleration of the setting device.

* * * * *